(12) United States Patent
Yin et al.

(10) Patent No.: US 12,256,278 B2
(45) Date of Patent: Mar. 18, 2025

(54) BEARER MODIFICATION METHOD AND ACCESS NETWORK DEVICE

(71) Applicant: Huawei Technologies Co., Ltd., Shenzhen (CN)

(72) Inventors: Yu Yin, Shanghai (CN); Caixia Qi, Shanghai (CN); Zhenyu Tao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 17/525,206

(22) Filed: Nov. 12, 2021

(65) Prior Publication Data

US 2022/0078677 A1     Mar. 10, 2022

Related U.S. Application Data

(63) Continuation of application No. PCT/CN2020/090225, filed on May 14, 2020.

(30) Foreign Application Priority Data

May 15, 2019   (CN) .......................... 201910406656.6

(51) Int. Cl.
*H04W 36/06*     (2009.01)
*H04W 36/08*     (2009.01)
(Continued)

(52) U.S. Cl.
CPC ........... *H04W 36/06* (2013.01); *H04W 36/08* (2013.01); *H04W 60/00* (2013.01); *H04W 88/06* (2013.01)

(58) Field of Classification Search
CPC ..... H04W 36/00; H04W 36/06; H04W 36/16; H04W 60/00; H04W 88/06; H04W 76/12;
(Continued)

(56) References Cited

U.S. PATENT DOCUMENTS

| 9,655,159 B2 | 5/2017 | Paladugu et al. |
| 10,397,184 B2 * | 8/2019 | Avula .................... H04W 76/12 |

(Continued)

FOREIGN PATENT DOCUMENTS

| CN | 103491602 A | 1/2014 |
| CN | 108093473 A | 5/2018 |

(Continued)

OTHER PUBLICATIONS

"Radio Access Bearer Assignment Procedure," Agenda Item: 10.1, Source: Nokia, Document for: Decision, TSG-RAN Working Group 3 Meeting #6, TSGR3#6(99)A09, R3-99A09, Sophia Antipolis, France, Aug. 1999, 6 pages.

(Continued)

*Primary Examiner* — Hassan A Phillips
*Assistant Examiner* — Prenell P Jones
(74) *Attorney, Agent, or Firm* — SLATER MATSIL, LLP

(57) ABSTRACT

A bearer modification method and an access network device. The method includes determining, by an access network device, that a terminal device completes a complete registration procedure, or determining that the terminal device does not complete the complete registration procedure, and waiting for the terminal device to complete the complete registration procedure, and modifying, by the access network device, a radio access bearer of the terminal device.

17 Claims, 10 Drawing Sheets

(51) Int. Cl.
*H04W 60/00* (2009.01)
*H04W 88/06* (2009.01)

(58) Field of Classification Search
CPC ..... H04W 36/08; H04W 76/15; H04W 76/22; H04W 76/11; H04W 28/18; H04W 28/20; H04W 28/24
See application file for complete search history.

(56) References Cited

U.S. PATENT DOCUMENTS

| | | | |
|---|---|---|---|
| 2007/0104116 A1* | 5/2007 | Olvera-Hernandez | ............ H04W 36/005 370/254 |
| 2008/0291868 A1 | 11/2008 | Prakash et al. | |
| 2012/0044868 A1* | 2/2012 | Faccin | ............ H04W 24/08 370/328 |
| 2012/0202491 A1* | 8/2012 | Fox | ............ H04W 12/102 455/450 |
| 2013/0128865 A1* | 5/2013 | Wu | ............ H04W 36/00226 370/331 |
| 2013/0183971 A1* | 7/2013 | Tamaki | ............ H04W 36/165 455/436 |
| 2014/0254476 A1* | 9/2014 | Blankenship | ............ H04W 28/22 370/328 |
| 2015/0195864 A1* | 7/2015 | Bartolome | ............ H04W 88/182 370/221 |
| 2015/0365963 A1* | 12/2015 | Won | ............ H04W 4/06 370/329 |
| 2016/0073297 A1* | 3/2016 | Hwang | ............ H04W 76/20 370/331 |
| 2016/0112896 A1* | 4/2016 | Karampatsis | ............ H04L 47/32 370/230.1 |
| 2016/0174120 A1* | 6/2016 | Zembutsu | ............ H04W 36/36 370/331 |
| 2016/0338130 A1* | 11/2016 | Park | ............ H04W 76/12 |
| 2016/0359750 A1* | 12/2016 | Miklós | ............ H04L 5/006 |
| 2017/0150467 A1* | 5/2017 | Tamura | ............ H04W 48/14 |
| 2017/0215078 A1* | 7/2017 | Mochizuki | ............ H04W 4/90 |
| 2018/0041892 A1 | 2/2018 | Hurtta | |
| 2018/0359662 A1* | 12/2018 | Kim | ............ H04W 48/02 |
| 2018/0367322 A1* | 12/2018 | Watanabe | ............ H04L 12/1403 |
| 2019/0014550 A1* | 1/2019 | Rommer | ............ H04L 41/12 |
| 2019/0028933 A1 | 1/2019 | Kawasaki et al. | |
| 2019/0116501 A1* | 4/2019 | Huang | ............ H04W 16/26 |
| 2019/0124040 A1* | 4/2019 | Avula | ............ H04W 76/12 |
| 2019/0261233 A1* | 8/2019 | Duan | ............ H04W 36/0066 |
| 2019/0319868 A1* | 10/2019 | Svennebring | ............ H04W 24/08 |
| 2019/0327646 A1* | 10/2019 | Goyal | ............ H04W 36/08 |
| 2020/0107213 A1* | 4/2020 | Park | ............ H04W 4/24 |
| 2020/0314701 A1* | 10/2020 | Talebi Fard | ............ H04W 36/08 |
| 2021/0014722 A1 | 1/2021 | Han et al. | |
| 2021/0029770 A1* | 1/2021 | Ying | ............ H04W 76/12 |

FOREIGN PATENT DOCUMENTS

| | | |
|---|---|---|
| CN | 108781391 A | 11/2018 |
| CN | 109412771 A | 3/2019 |
| EP | 3133864 A1 | 2/2017 |
| EP | 3280167 A1 | 2/2018 |
| WO | 2008134519 A1 | 11/2008 |
| WO | 2016096013 A1 | 6/2016 |

OTHER PUBLICATIONS

"Specifying Handling of Race Condition between E-RAB Setup and intra-E-UTRAN EN-DC Related Procedures," Source to WG: Ericsson, Source to TSG: R3, Work item code: NR_newRAT-Core, Date: May 3, 2019, Category: F, Release: Rel-15, Change Request, 3GPP TSG-RAN WG3 Meeting #104, R3-193094, Reno, NV, U.S., May 13-17, 2019, 11 pages.

"Correction on E-RAB Release Procedure During Race Condition between MME and eNB," Source to WG: NEC, Source to TSG: R3, Work item code: LTE-interfaces, Date: Aug. 23, 2010, Category: F, Release: Rel-9, Change Request, 3GPP TSG-RAN WG3 #69, R3-102291, Madrid, Spain, Aug. 23 -27, 2010, 4 pages.

"Specifying Handling of Race Condition between E-RAB Setup and intra-E-UTRAN EN-DC Related Procedures," Agenda Item: 9.3.23, Document for: Discussions & Approval, 3GPP TSG-RAN WG3 Meeting #104, R3-193013, Reno, NV, U.S., May 13-17, 2019, 1 page.

"Secondary RAT Related Data Usage Reporting," Source to WG: Ericsson, Nokia, NTT DOCOMO, Qualcomm Incorporated, Cisco, SK Telecom, AT&T, Source to TSG: SA WG2, Work item code: EDCE5, Date: Aug. 28, 2017, Category: B, Release: Rel-15, Change Request, SA WG2 Meeting #122-Bis, S2-176695, (e-mail revision 2 of S2-176162), Aug. 21-25, 2017, Sophia Antipolis, FR, 65 pages.

* cited by examiner

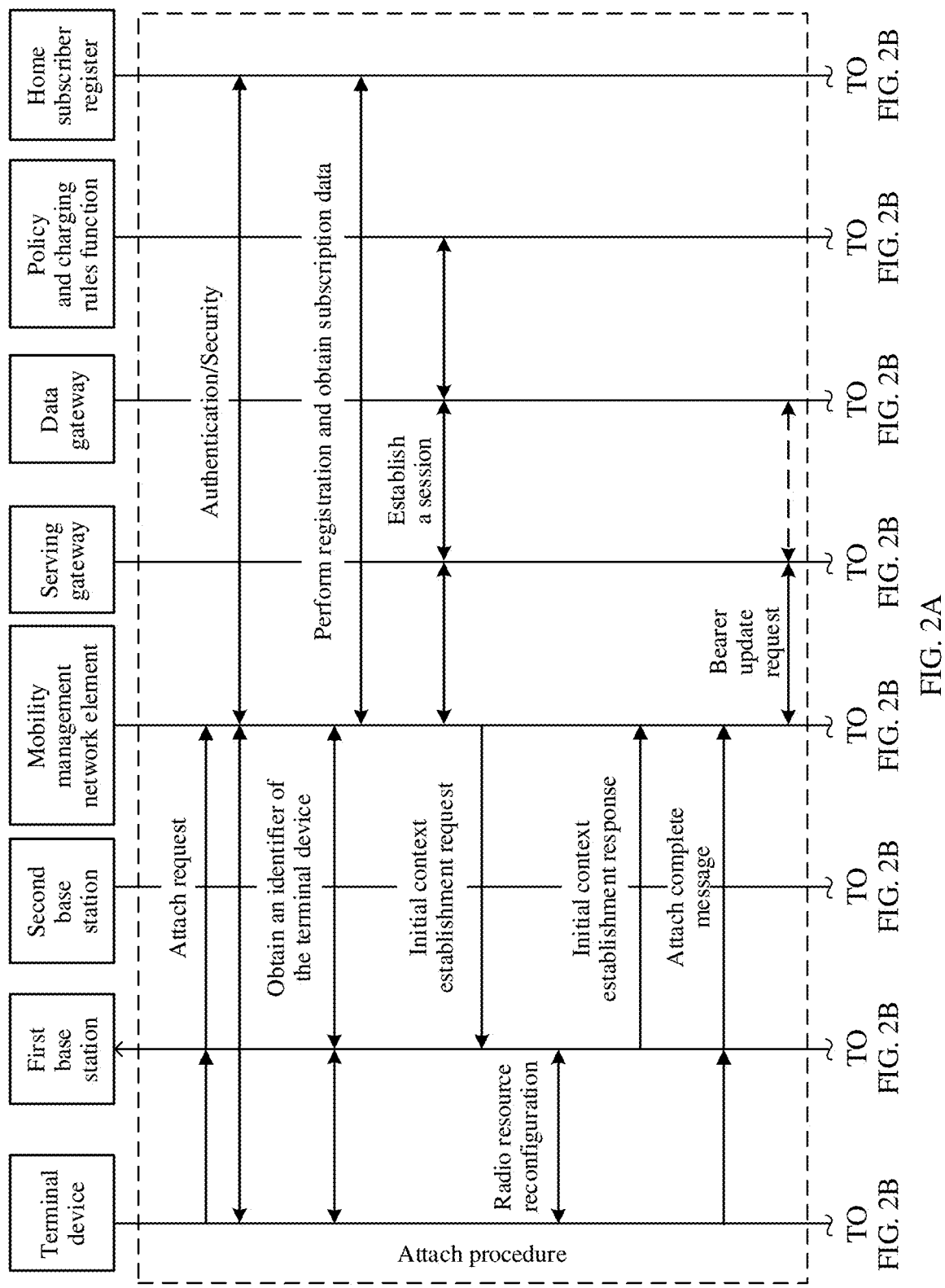

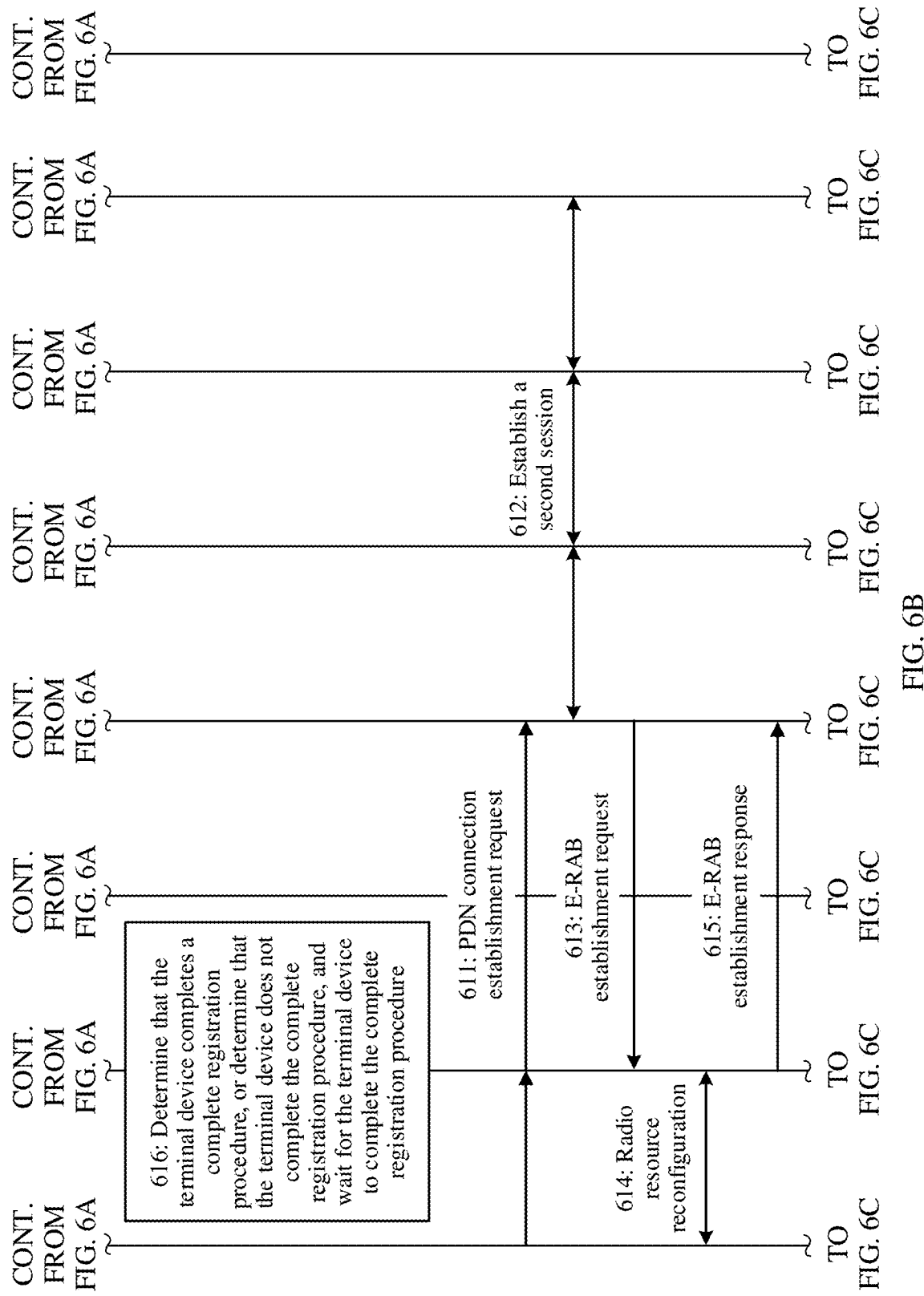

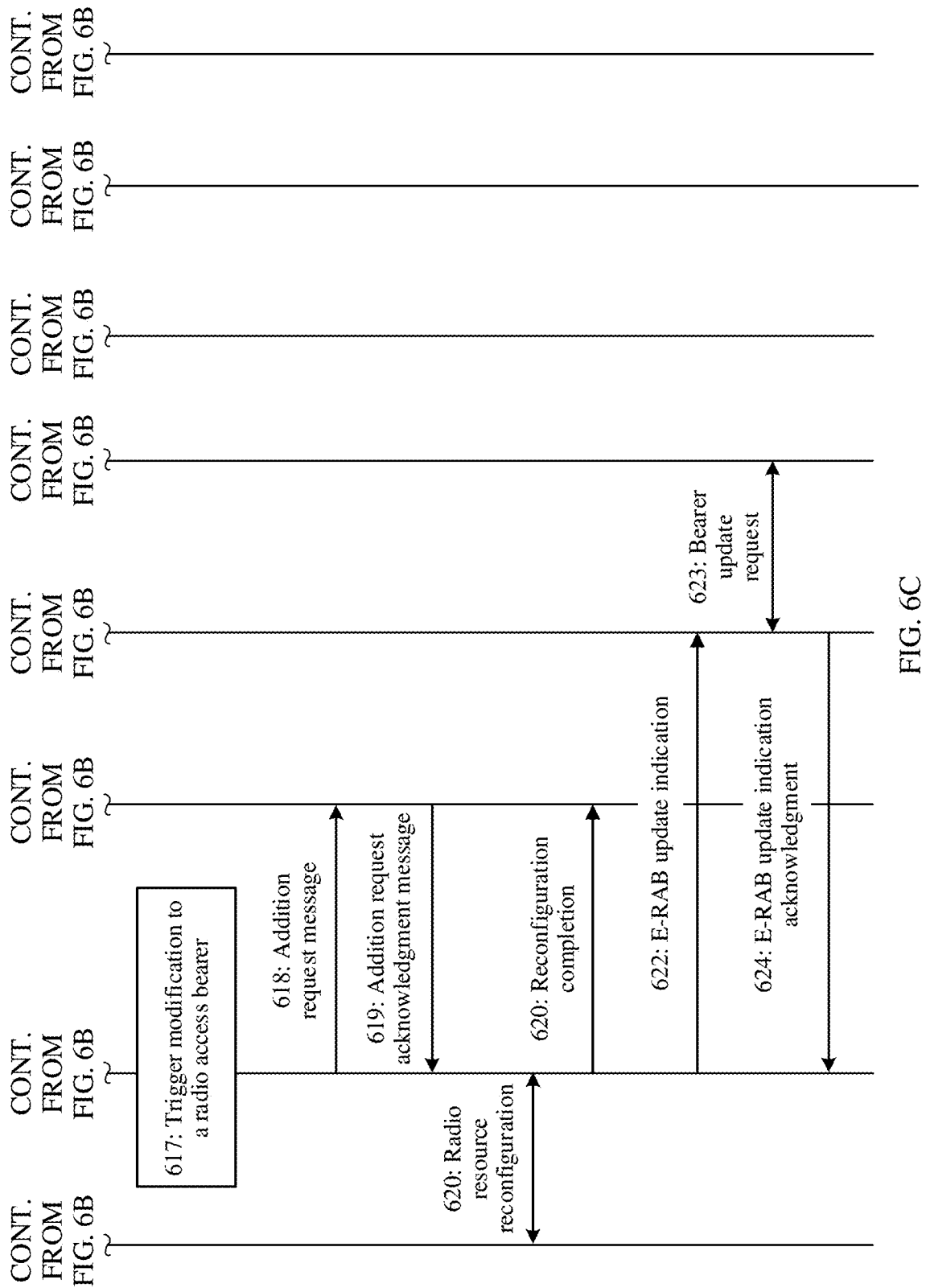

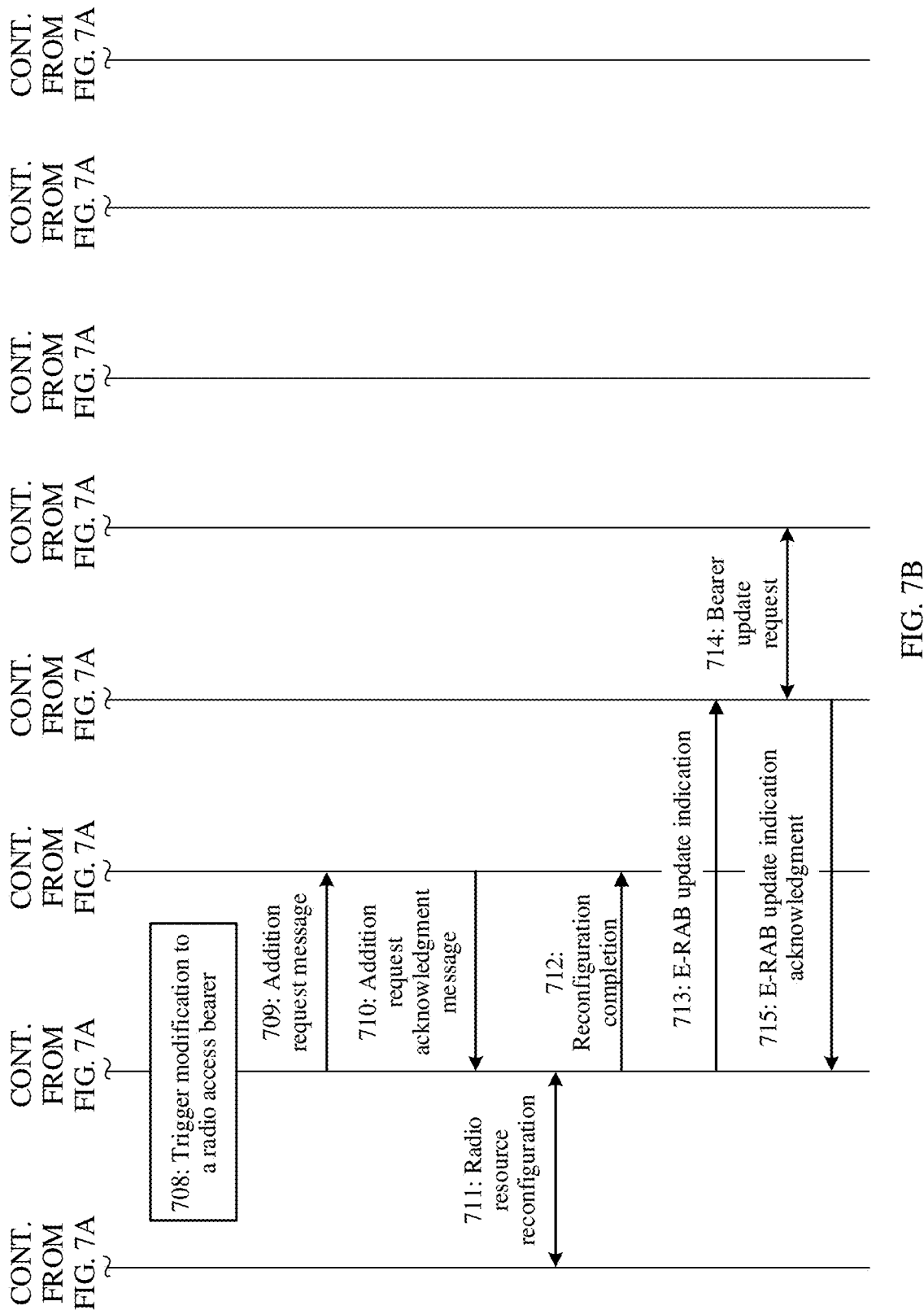

BEARER MODIFICATION METHOD AND ACCESS NETWORK DEVICE

CROSS-REFERENCE TO RELATED APPLICATIONS

This application is a continuation of International Application No. PCT/CN2020/090225, filed on May 14, 2020, which claims priority to Chinese Patent Application No. 201910406656.6, filed on May 15, 2019. The disclosures of the aforementioned applications are hereby incorporated by reference in their entireties.

TECHNICAL FIELD

Embodiments of the present invention relate to the field of communications technologies, and in particular, to a bearer modification method and an access network device.

BACKGROUND

In a mobile communications network, an access network device may actively trigger modification to a radio access bearer of a terminal device. For example, when the access network device cannot satisfy quality of service (QoS) of the radio access bearer, the access network device modifies a QoS parameter of the radio access bearer.

In another typical scenario, in a dual connectivity (DC) networking architecture, the terminal device may establish a connection to two access network devices. One of the two access network devices that determines to establish a dual connectivity may be referred to as a primary access network device, and the other access network device may be referred to as a second access network device or a secondary access network device. A service data packet may be sent to the terminal device by the primary access network device or the second access network device, and the primary access network device determines whether the service data packet is forwarded by the primary access network device or the second access network device. The primary access network device may trigger modification to the radio access bearer based on a network condition, for example, modifying the service data packet from being forwarded by the primary access network device to being forwarded by the second access network device, or modifying the service data packet from being forwarded by the second access network device to being forwarded by the primary access network device.

In an existing network, the terminal device performs a complete registration procedure to access the network. For example, the complete registration procedure includes a registration procedure and a second-session establishment procedure. A first session is established and a default bearer of a data service is established in the registration process. Then, a second session is immediately established, and a default bearer of a voice service is established. For another example, the complete registration procedure includes a registration procedure, a first-session establishment procedure, and a second-session establishment procedure. After registering with the network in the registration procedure, the terminal device immediately establishes a first session and establishes a default bearer of a data service. Then, the terminal device immediately establishes a second session, and establishes a default bearer of a voice service.

The access network device is unaware of the complete registration procedure. When the radio access bearer of the terminal device has been established on the access network device, and a current condition meets a radio access bearer modification condition, the access network device triggers modification to the radio access bearer. Especially, to enable the terminal device to enjoy ultimate service experience of $5^{th}$ generation (5G) high bandwidth and low latency as soon as possible, the access network device transfers the data service of the terminal device to the second access network device for forwarding as soon as possible. This exacerbates a conflict between the modification to the radio access bearer triggered by the access network device and the complete registration procedure of the terminal device. As a result, the complete registration procedure conflicts with the foregoing modification to the radio access bearer. For example, a procedure of establishing a second session of the voice service conflicts with the foregoing modification to the radio access bearer. Consequently, a deadlock occurs between the primary access network device and a core network device, a signaling procedure cannot succeed, and a service of the terminal device cannot be normally performed. This greatly deteriorates the service experience of the terminal device.

SUMMARY

Embodiments of the present invention disclose a bearer modification method and an access network device, to improve service experience of a terminal device.

A first aspect discloses a bearer modification method. An access network device determines that a terminal device completes a complete registration procedure, or determines that the terminal device does not complete the complete registration procedure, and waits for the terminal device to complete the complete registration procedure, and then, the access network device modifies a radio access bearer. It can be learned that modification to the radio access bearer of the terminal device is performed after the access network device determining that the terminal device completes the complete registration procedure or waiting for the terminal device to complete the complete registration procedure. In this way, the modification does not conflict with the complete registration procedure of the terminal device, and normal running of a service of the terminal device is not affected. This can improve service experience of the terminal device.

In a possible implementation, that an access network device determines that a terminal device completes a complete registration procedure may be determining that the terminal device has completed the complete registration procedure, or may be determining that the terminal device has completed the complete registration procedure within first time.

In a possible implementation, that a terminal device completes a complete registration procedure may include a quantity of radio access bearers in context of the terminal device is greater than or equal to a first threshold, and/or a parameter of one radio access bearer included in the context of the terminal device is a specific value.

In a possible implementation, that an access network device waits for the terminal device to complete the complete registration procedure may include one or more of the following, including a quantity of radio access bearers in context of the terminal device is greater than or equal to a first threshold, a parameter of one radio access bearer included in the context of the terminal device is a specific value, and waiting time of the access network device exceeds first time.

In a possible implementation, the parameter of the radio access bearer may be one or more of a quality of service (QoS) type, an allocation and retention priority (ARP), and an aggregate maximum bit rate (AMBR).

In a possible implementation, the QoS type may be a quality of service class identifier (QoS class identifier, QCI), or may be a 5G quality of service identifier (5G QoS identifier, 5QI).

In a possible implementation, before modifying the radio access bearer, the access network device further needs to determine that a current condition meets a trigger condition of a radio access bearer modification procedure. The radio access bearer modification procedure may include addition, modification, deletion, or a change of a second access network device, or a QoS update.

In a possible implementation, the access network device may send, to a core network device, a radio access bearer update indication message that carries an Internet protocol (IP) address and a tunnel endpoint identifier (TEID) of the second access network device, and receive a radio access bearer update indication acknowledgment message from the core network device, to complete the modification to the radio access bearer.

In a possible implementation, the access network device may send, to a core network device, a radio access bearer modification request message that carries a QoS parameter of the radio access bearer, and receive a radio access bearer modification response message from the core network device, to complete modification to the radio access bearer. The QoS parameter may be one or more of a QCI, an ARP, uplink or downlink bandwidth, a QoS flow identifier (QFI), a QoS satisfaction indication, and the like. The QoS satisfaction indication is used to notify a network that QoS cannot be satisfied, to help the network adjust the QoS parameter.

A second aspect discloses an access network device. The access network device includes units configured to perform the bearer modification method disclosed in the first aspect or any embodiment of the first aspect.

A third aspect discloses an access network device. The access network device includes a processor. The processor and a memory are coupled to each other. The memory is configured to store a computer program or instructions. The processor is configured to execute the computer program or instructions stored in the memory, so that the access network device performs the bearer modification method disclosed in the first aspect or any embodiment of the first aspect.

A fourth aspect discloses a readable storage medium. The readable storage medium stores a program. When the program is run, the bearer modification method disclosed in the first aspect or any embodiment of the first aspect is implemented.

BRIEF DESCRIPTION OF THE DRAWINGS

FIG. 2A and FIG. 2B are a schematic flowchart of a possible conflict in an access network device;

FIG. 6A to FIG. 6C are a schematic flowchart of still another bearer modification method according to an embodiment of the present invention;

FIG. 7A and FIG. 7B are a schematic flowchart of still another bearer modification method according to an embodiment of the present invention;

DETAILED DESCRIPTION OF ILLUSTRATIVE EMBODIMENTS

Embodiments of the present invention disclose a bearer modification method and an access network device, to improve service experience of a terminal device. The following provides descriptions in detail.

Figure 1:
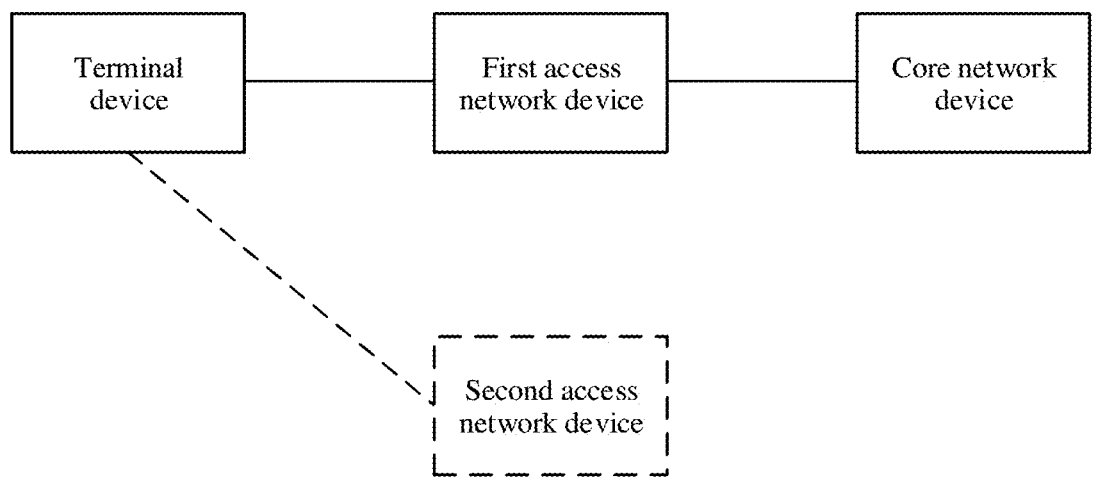
FIG. 1 is a schematic diagram of a network architecture according to an embodiment of the present invention.

To better understand the bearer modification method and the access network device disclosed in the embodiments of the present invention, the following first describes a network architecture used in the embodiments of the present invention. FIG. 1 is a schematic diagram of a network architecture according to an embodiment of the present invention. As shown in FIG. 1, the network architecture may include a terminal device, an access network device, and a core network device. The terminal device accesses a core network by using the access network device. The core network device is responsible for functions, such as location management, connection management, and security authentication, of the terminal device.

In a DC architecture, there may be one or more access network devices. FIG. 1 shows only two access network devices. At least one access network device in the one or more access network devices determines establishment of a dual connectivity. There is a signaling interface between the access network device and the core network device, and the access network device may directly perform signaling interaction with the core network device. This access network device may be referred to as a primary access network device, for example, a first access network device shown in FIG. 1. An access network device in the one or more access network devices other than the primary access network device may be referred to as a second access network device or a secondary access network device, for example, a second access network device shown in FIG. 1.

An actual network corresponding to the foregoing network architecture may be an evolved packet system (EPS) network. For an evolved universal terrestrial radio access network (E-UTRAN), the core network device may be a mobility management entity (MME). In addition, the EPS network may further include a serving gateway (S-GW). The serving gateway is a local access gateway of the terminal device, and is responsible for connection management and data forwarding that are related to an access technology. The EPS network may further include a packet data network gateway (PDN-GW), and the packet data network gateway is a gateway used by the terminal device to access an external data network. The EPS network may further include a home subscriber server (home subscriber server, HSS), and the home subscriber server is responsible for managing and maintaining subscription information of a home subscriber. The EPS network may further include a policy and charging rules function (PCRF) entity, and the policy and charging rules function entity is responsible for policy control, charging, QoS rule delivery, and the like.

Alternatively, an actual network corresponding to the foregoing network architecture may be a 5G network, and the core network device may be an access and mobility management function (AMF) entity. In addition, the 5G network may further include a session management function (SMF) entity, and the session management function entity is responsible for session establishment/update/deletion of the terminal device. The 5G network may further include a user plane function (UPF) entity, and the user plane function entity is responsible for forwarding a service data packet of the terminal device. The 5G network may further include a unified data management (UDM) entity, and the unified data management entity is responsible for managing and maintaining subscription information of a home subscriber. The 5G network may further include a policy and charging rules function which may be a policy control function (PCF) entity, and the policy control function entity is responsible for policy control, charging, QoS rule delivery, and the like.

The terminal device may be referred to as a terminal, user equipment (UE), a mobile station (MS), a mobile terminal (MT), or the like. The terminal device may be a mobile phone, a tablet (Pad), a computer having wireless sending and receiving functions, a virtual reality (VR) terminal device, an augmented reality (AR) terminal device, a wireless terminal in industrial control, a wireless terminal in self-driving, a wireless terminal in remote surgery (remote medical surgery), a wireless terminal in smart grid, a wireless terminal in transportation safety, a wireless terminal in smart city, a wireless terminal in smart home, or the like. A specific technology and a specific device form used for the terminal device are not limited in the embodiments of this application.

The access network device is an access device used by the terminal device to access the core network. The access network device may be a NodeB, an evolved NodeB (eNB), a radio network controller (RNC), a transmission reception point (TRP), a next generation NodeB (gNB) in a 5G mobile communications system, a base station in a future mobile communications system, an access network device in a Wi-Fi system, or the like. A specific technology and a specific device form used for a radio access network device are not limited in the embodiments of this application.

Figure 2B:
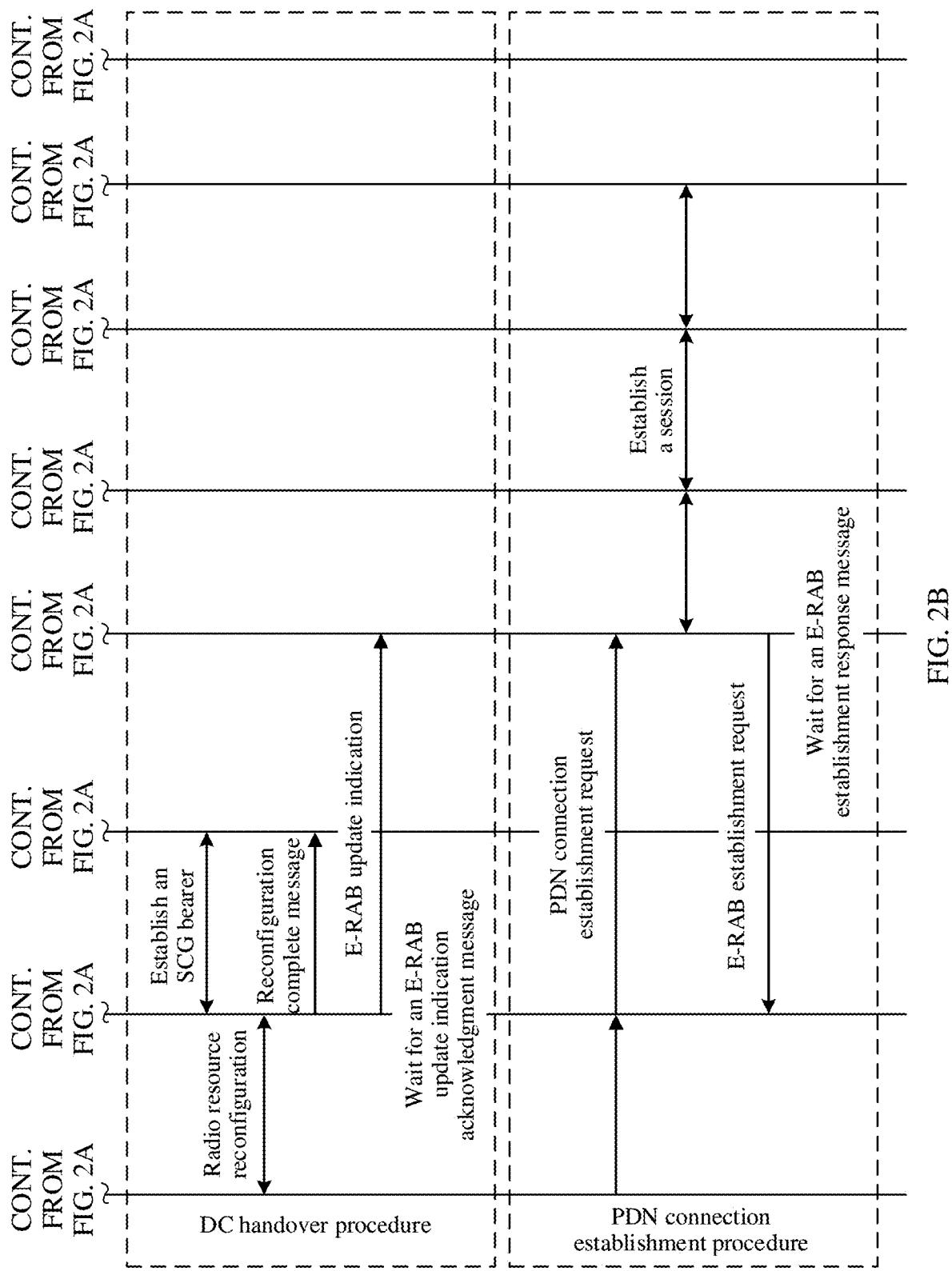

To better understand the bearer modification method and the access network device disclosed in the embodiments of the present invention, the following first describes an application scenario of an embodiment of the present invention. FIG. 2A and FIG. 2B are a schematic flowchart of a possible conflict in the access network device. As shown in FIG. 2A and FIG. 2B, an EPS network is used as an example. A terminal device triggers a complete registration procedure, to access a mobile communications network to perform a service. The complete registration procedure corresponding to FIG. 2A and FIG. 2B includes an attach procedure and a packet data network (PDN) connection establishment procedure. In the attach procedure, the terminal device may initiate the attach procedure by sending an attach request to a mobility management network element via a first base station (that is, the first access network device in the foregoing network architecture), to access the mobile communications network. After receiving the attach request, the mobility management network element may trigger an authentication procedure for the terminal device to ensure security of the terminal device. Then, the mobility management network element may obtain an identifier of the terminal device from the terminal device via the first base station. The identifier of the terminal device may be an international mobile subscriber identity (IMSI). Then, the mobility management network element may register information about the mobility management network element with a home subscriber register, and obtain subscription data of the terminal device from the home subscriber register. After receiving the attach request, the mobility management network element may further request to establish a default bearer (a first session) of a data service. The default bearer of the data service may be established via a serving gateway and a data gateway. In addition, a session of the data service is established between a data network element and a policy and charging rules function, to obtain charging and policy rules corresponding to the data service. After receiving the subscription data of the terminal device from the home subscriber register, and receiving a response to establishment of the default bearer of the data service from the serving gateway, the mobility management network element sends an initial context establishment request message to the first base station. The initial context establishment request message carries an attach acceptance message and a radio access bearer (E-UTRAN radio access bearer, E-RAB) corresponding to the to-be-established default bearer of the data service. After receiving the initial context establishment request message from the mobility management network element, the first base station establishes context of the terminal device, performs radio resource reconfiguration with the terminal device, and sends an initial context establishment response to the mobility management network element. The initial context establishment response carries an IP address and a TEID of the first base station that are allocated to the E-RAB corresponding to the default bearer of the data service. After completing radio bearer resource reconfiguration with the first base station, the terminal device sends an attach complete message to the mobility management network element via the first base station. After receiving the initial context establishment response and the attach complete message, the mobility management network element sends a bearer update request to the serving gateway. The bearer update request carries the IP address and the TEID of the first base station. After receiving the bearer update request from the mobility management network element, the serving gateway may send information such as a location of the terminal device to the data gateway. Then, attachment of the terminal device is completed. The terminal device switches from an idle mode to a connected mode, and successfully accesses a core network. A service data packet forwarded on the default bearer of the data service is forwarded by the first base station.

After the attach procedure is completed, the terminal device immediately triggers establishment of a second session, and initiates the PDN connection establishment procedure, to establish a default bearer of a voice service. The terminal device may initiate the PDN connection establishment procedure by sending a PDN connection establishment request to the mobility management network element via the first base station, to request to establish the default bearer of the voice service. Then, the mobility management network element establishes the default bearer of the voice service via the serving gateway and the data gateway. A session of the voice service is established between the data network element and the policy and charging rules function, to obtain charging and policy rules corresponding to the voice service. Then, the mobility management network element sends an E-RAB establishment request to the first base station, and requests the first base station to establish an E-RAB corresponding to the default bearer of the voice service, where the E-RAB establishment request carries a PDN connection establishment acceptance message. Then, the mobility management network element waits for the first base station to reply with an E-RAB establishment response message.

The first base station establishes context of the terminal device by using the initial context establishment request message in the attach procedure. After sending the initial context establishment response to the mobility management network element, if a current condition meets a trigger condition of a radio access bearer modification procedure, the first base station triggers the radio access bearer modification procedure. A DC architecture is used as an example. The first base station in the attach procedure and the PDN connection establishment procedure is a primary base station. The primary base station may determine, according to a stored DC policy, whether a current condition meets a condition for adding a second base station. When determining that the current condition meets the condition for adding the second base station, the primary base station triggers a procedure for adding the second base station. The DC policy may be that when signal strength of the second base station meets a requirement, the data service is forwarded by the second base station. The primary base station initiates the procedure for adding the second base station, and hands over the E-RAB corresponding to the default bearer of the data service to the second base station. Then, the primary base station performs radio resource reconfiguration with the terminal device, to allocate a radio bearer resource of the second base station to the default bearer of the data service. Then, the primary base station sends a reconfiguration complete message to the second base station, to notify the second base station that radio resource allocation is completed. Then, the primary base station modifies the radio access bearer, and sends an E-RAB update indication message to the mobility management network element, where the E-RAB update indication message carries an IP address and a TEID that are allocated by the second base station to the E-RAB corresponding to the default bearer of the data service, so that the service data packet forwarded on the default bearer of the data service is forwarded by the second base station. Then, the primary base station waits for an E-RAB update indication acknowledgment message from the mobility management network element.

It can be learned that when a conflict occurs between the radio access bearer modification procedure in the complete registration procedure and the PDN connection establishment procedure of the voice service initiated by the terminal device in the complete registration procedure, the primary base station may wait for the mobility management network element to reply with the E-RAB update indication acknowledgment message, and cannot process the message after receiving the E-RAB establishment request of the default bearer of the voice service sent by the mobility management network element. However, the mobility management network element waits for the primary base station to reply with an E-RAB establishment response message, and cannot process the message after receiving the E-RAB update indication message sent by the primary base station. A deadlock occurs between the primary base station and the mobility management network element. As a result, neither the radio access bearer modification procedure nor the PDN connection establishment procedure of the voice service succeeds. Consequently, service experience of the terminal device seriously deteriorates. In addition, the primary base station and the terminal device continue to retry the procedures after the procedures fail, and a conflict occurs again during a retry process, resulting in the deadlock. Finally, the terminal device may fall back to a 2G/3G network.

Figure 3:
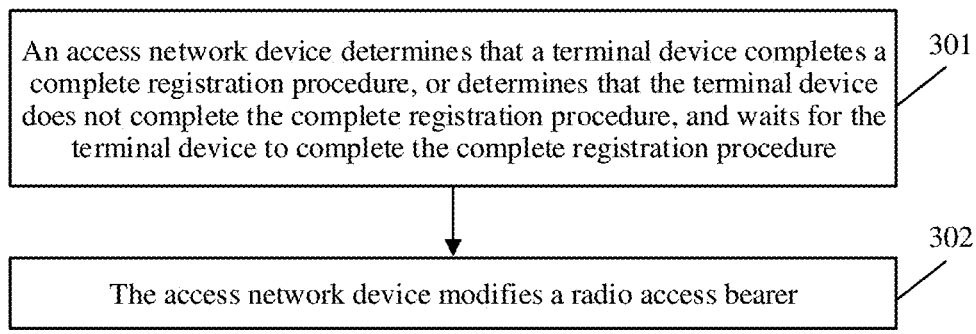
FIG. 3 is a schematic flowchart of a bearer modification method according to an embodiment of the present invention.

Based on the network architecture shown in FIG. 1, FIG. 3 is a schematic flowchart of a bearer modification method according to an embodiment of the present invention, to resolve a conflict between a radio access bearer modification procedure of a terminal device in an access network device and a registration procedure. As shown in FIG. 3, the bearer modification method may include the following steps.

301: The access network device determines that the terminal device completes a complete registration procedure, or determines that the terminal device does not complete the complete registration procedure, and waits for the terminal device to complete the complete registration procedure.

The access network device may determine whether the terminal device completes the complete registration procedure. When determining that the terminal device completes the complete registration procedure, the access network device may determine that the terminal device completes the complete registration procedure. When determining that the terminal device does not complete the complete registration procedure, the access network device may wait for the terminal device to complete the complete registration procedure. The access network device may perform the determining at any time, for example, after the registration procedure is completed, in a process of establishing a session of a voice service, in the registration procedure, in a process of establishing a session of a data service, or at other time. The access network device herein and hereafter is a primary access network device in a DC network architecture.

That the access network device determines that the terminal device completes the complete registration procedure may be the terminal device has completed the complete registration procedure when the access network device performs the determining, or the terminal device completes the complete registration procedure within first time that elapses after the determining. The complete registration procedure of the terminal device may include the attach procedure and the PDN connection establishment procedure that are shown in FIG. 2A and FIG. 2B, or may be another procedure. This is not limited herein.

That the terminal device completes the complete registration procedure may be a quantity of radio access bearers in context of the terminal device is greater than or equal to (or greater than) a first threshold, or a parameter of one radio access bearer included in the context of the terminal device is a specific value. The parameter of the radio access bearer may be one or more of a QoS type, an ARP, and an AMBR. The QoS type may be a QCI, or may be a 5QI. The radio access bearer may have a different name in a different network. For example, in a 5G network, the radio access bearer may be an E-RAB or a QoS flow, in a 4G network, the radio access bearer may be an E-RAB, in a 3G network, the radio access bearer may be a radio access bearer (RAB), in another network, the radio access bearer may have another name. This is not limited in this embodiment.

When the access network device determines that the terminal device does not complete the complete registration procedure, the access network device may wait for the terminal device to complete the complete registration procedure. In an implementation, the access network device may wait until the terminal device completes the complete registration procedure, that is, the quantity of radio access bearers in the context of the terminal device is greater than or equal to (or greater than) the first threshold, the parameter of the one radio access bearer included in the context of the terminal device is the specific value, or the quantity of the radio access bearers in the context of the terminal device is greater than or equal to (or greater than) the first threshold, and the parameter of the one radio access bearer included in the context of the terminal device is the specific value. In this way, the access network device starts the radio access bearer modification procedure only after the terminal device completes the complete registration procedure, so that a conflict can be avoided.

The foregoing implementation of waiting until the terminal device completes the complete registration procedure can effectively avoid a conflict, but is relatively low in efficiency. In another implementation, the first time may be set for the access network device as waiting time. To be specific, when determining that the terminal device does not complete the complete registration procedure, the access network device may wait for the first time. If the terminal device completes the complete registration procedure within the first time, the access network device determines that the terminal device completes the complete registration procedure. If the terminal device has not completed the complete registration procedure after waiting time exceeds the first time, the access network device may not continue waiting, and may directly modify the radio access bearer of the terminal device.

When the access network device does not continue waiting after the waiting time exceeds the first time, a timer may be started after it is determined that the terminal device has not completed the complete registration procedure. Alternatively, a timer may be started when context of the terminal device is established on the access network device, a timer may be started when the $1^{st}$ radio access bearer of the terminal device is established, or a timer may be started when the access network device determines that a current condition meets a trigger condition of the radio access bearer modification procedure. Then, whether the terminal device completes the complete registration procedure may be detected in real time or periodically. When the timer does not expire and the access network device detects that the terminal device completes the complete registration procedure, the access network device may determine that the terminal device has completed the complete registration procedure within the first time, and may directly modify the radio access bearer of the terminal device. In addition, the access network device may stop the timer, and stops counting. When the timer expires and the access network device does not detect that the terminal device completes the complete registration procedure, the access network device may directly modify the radio access bearer of the terminal device. The access network device may stop the timer and stop counting and waiting. Start time of the timer may be the first time. In this case, that the timer expires means that time of the timer is equal to zero.

When the radio access bearer of the terminal device can be modified only after the terminal device completes the complete registration procedure, the access network device may not need to start the timer after determining that the terminal device does not complete the complete registration procedure. The access network device may detect, in real time or periodically, whether the terminal device completes the complete registration procedure, and modifies the radio access bearer of the terminal device only after detecting that the terminal device completes the registration procedure.

302: The access network device modifies the radio access bearer.

The access network device may modify the radio access bearer of the terminal device after determining that the terminal device completes the complete registration procedure, or determining that the terminal device does not complete the complete registration procedure and waiting for the terminal device to complete the complete registration procedure.

Modifying the radio access bearer of the terminal device may be sending a radio access bearer update indication message to a core network device, and receiving a radio access bearer update indication acknowledgment message from the core network device, to complete modification to the radio access bearer of the terminal device. The radio access bearer update indication message may carry an IP address and a TEID of an updated access network device. The updated access network device may be a second access network device, indicating that subsequent service data of the terminal device is forwarded by the second access network device. The updated access network device may alternatively be the access network device, indicating that the subsequent service data of the terminal device is forwarded by the access network device.

Modifying the radio access bearer of the terminal device may alternatively be sending a radio access bearer update indication message to the core network device, and receiving a radio access bearer update indication acknowledgment message from the core network device, to complete the modification to the radio access bearer. The radio access bearer update indication message may carry a QoS parameter of the radio access bearer, so that the core network device modifies QoS of the terminal device according to the QoS parameter.

Figure 4:
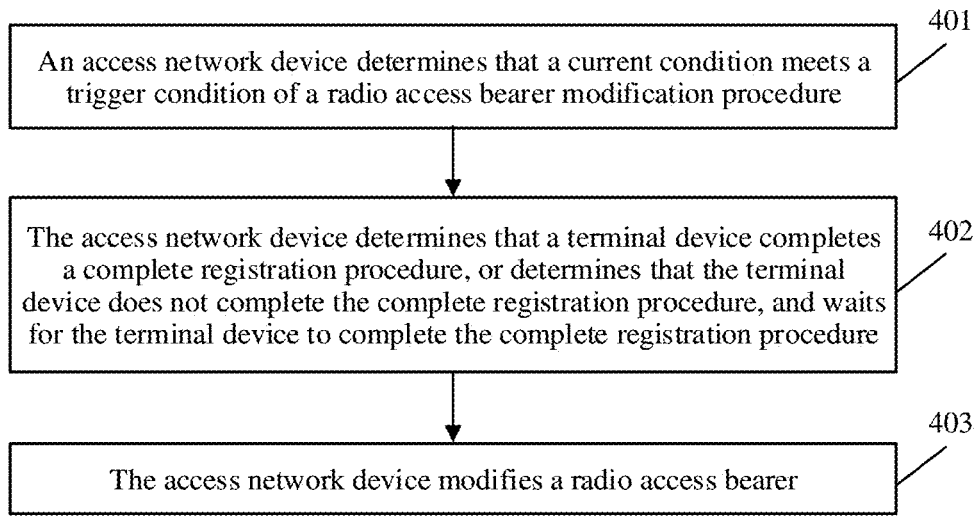
FIG. 4 is a schematic flowchart of another bearer modification method according to an embodiment of the present invention.

Based on the network architecture shown in FIG. 1, FIG. 4 is a schematic flowchart of another bearer modification method according to an embodiment of the present invention. As shown in FIG. 4, the bearer modification method may include following steps.

401: An access network device determines that a current condition meets a trigger condition of a radio access bearer modification procedure.

The access network device may determine, in real time or periodically, whether the current condition meets the trigger condition of the radio access bearer modification procedure. When determining that the current condition meets the trigger condition of the radio access bearer modification procedure, the access network device may continue to determine whether a terminal device completes a complete registration procedure. For details about determining whether the terminal device completes the complete registration procedure and details about related content, refer to the descriptions of step 301. Details are not described herein again.

When the access network device determines that the current condition does not meet the trigger condition of the radio access bearer modification procedure, if the access network device determines, in real time, whether the current condition meets the trigger condition of the radio access bearer modification procedure, the access network device may continue to determine whether the current condition meets the trigger condition of the radio access bearer modification procedure, or if the access network device periodically determines whether the current condition meets the trigger condition of the radio access bearer modification procedure, the access network device may determine, after a next period arrives, whether the current condition meets the trigger condition of the radio access bearer modification procedure.

The radio access bearer modification procedure may be addition of a second access network device. Before the second access network device is added, the terminal device establishes a connection only to the access network device, and service data of the terminal device is forwarded only by the access network device. After the second access network device is added, the terminal device establishes a connection to both the access network device and the second access network device, and the service data of the terminal device may be forwarded by the access network device, or may be forwarded by the second access network device. Specifically, whether one piece of service data is forwarded by the access network device or the second access network device is determined by the access network device.

Alternatively, the radio access bearer modification procedure may be modification to a second access network device. Before and after the second access network device is modified, the terminal device establishes a connection to both the access network device and the second access network device. After the second access network device is modified, some service data of the terminal device is modified from being forwarded by the access network device to being forwarded by the second access network device. That is, the service data of the terminal device forwarded by the second access network device is added.

Alternatively, the radio access bearer modification procedure may be deletion of a second access network device. Before the second access network device is deleted, the terminal device establishes a connection to both the access network device and the second access network device. After the second access network device is deleted, the terminal device establishes a connection only to the access network device.

Alternatively, the radio access bearer modification procedure may be a change of a second access network device. Before the second access network device changes, the second access network device is an access network device 1. After the second access network device changes, the second access network device is an access network device 2. The access network device 1 and the access network device 2 are different access network devices. That is, the second access network device that is before the second access network device changes and the second access network device that is after the second access network devices change are different access network devices. In this case, the network architecture shown in FIG. 1 includes at least three access network devices.

Alternatively, the radio access bearer modification procedure may be a QoS update. When the current condition cannot meet a QoS requirement of a radio access bearer, the access network device triggers the radio access bearer modification procedure, to modify a QoS parameter of the radio access bearer.

The current condition may be a current condition of the access network device. A trigger condition may be that the access network device is overloaded, may be that a load of the access network device decreases, may be that the access network device cannot satisfy QoS of the radio access bearer, may be that a signal of the second access network device meets a requirement, may be that the terminal device has established a session of a specific service, may be that the terminal device is outside current coverage of the second access network device, or the like.

402: The access network device determines that the terminal device completes the complete registration procedure, or determines that the terminal device does not complete the complete registration procedure, and waits for the terminal device to complete the complete registration procedure.

After determining that the current condition meets the trigger condition of the radio access bearer modification procedure, the access network device may determine that the terminal device completes the complete registration procedure, or may determine that the terminal device does not complete the complete registration procedure, and wait for the terminal device to complete the complete registration procedure. For detailed descriptions, refer to step 301. Details are not described herein again.

Steps 401 and 402 may be relatively independent, and there is no necessary sequence. That is, steps 401 and 402 may be performed concurrently, or may be performed sequentially.

The access network device may independently determine that the terminal device completes the complete registration procedure, or determine that the terminal device does not complete the complete registration procedure, and wait for the terminal device to complete the complete registration procedure. After determining that the terminal device completes the complete registration procedure, or determining that the terminal device does not complete the complete registration procedure, and waiting for the terminal device to complete the complete registration procedure, the access network device may use flag information such as a flag or an identifier to indicate that the access network device has determined that the terminal device completes the complete registration procedure, or that the terminal device does not complete the complete registration procedure, and waits for the terminal device to complete the complete registration procedure. Each time step 402 needs to be performed, whether step 402 has been performed may be determined by finding whether there is the flag information. If the flag information is found, it indicates that step 402 has been performed and does not need to be performed again. If the flag information is not found, it indicates that step 402 is not performed, and then step 402 is performed.

403: The access network device modifies the radio access bearer.

Step 403 is the same as step 302. For detailed descriptions, refer to step 302. Details are not described herein again.

In addition, when the radio access bearer modification procedure is addition of the second access network device, modification to the second access network device, or the change of the second access network device, the radio access bearer update indication message may carry an IP address and a TEID of the second access network device. When the radio access bearer modification procedure is deletion of the second access network device, the radio access bearer update indication message may carry an IP address and a TEID of the access network device. When the radio access bearer modification procedure is the QoS update, the radio access bearer update indication message may carry the QoS parameter of the radio access bearer. When the radio access bearer modification procedure is modification to the second access network device, the radio access bearer update indication message may alternatively carry an IP address and a TEID of the access network device.

Figure 5:
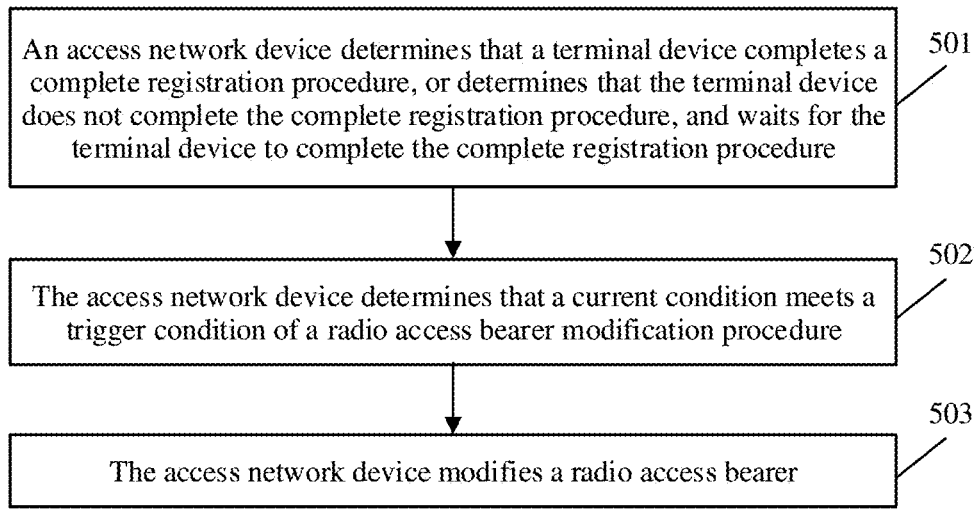
FIG. 5 is a schematic flowchart of still another bearer modification method according to an embodiment of the present invention.

Based on the network architecture shown in FIG. 1, FIG. 5 is a schematic flowchart of still another bearer modification method according to an embodiment of the present invention. As shown in FIG. 5, the bearer modification method may include following steps.

501: An access network device determines that a terminal device completes a complete registration procedure, or determines that the terminal device does not complete the complete registration procedure, and waits for the terminal device to complete the complete registration procedure.

Step 501 is the same as step 301. For detailed descriptions, refer to step 301. Details are not described herein again.

502: The access network device determines that a current condition meets a trigger condition of a radio access bearer modification procedure.

The access network device determines that the terminal device completes the complete registration procedure, or determines that the terminal device does not complete the complete registration procedure, and waits for the terminal device to complete the complete registration procedure. Then, the access network device may determine, in real time or periodically, whether the current condition meets the trigger condition of the radio access bearer modification procedure. When determining that the current condition meets the trigger condition of the radio access bearer modification procedure, the access network device determines that the current condition meets the trigger condition of the radio access bearer modification procedure, and may perform step 503. For detailed descriptions, refer to step 401. Details are not described herein again.

When the access network device determines that the current condition does not meet the trigger condition of the radio access bearer modification procedure, if the access network device determines, in real time, whether the current condition meets the trigger condition of the radio access bearer modification procedure, the access network device may continue to determine whether the current condition meets the trigger condition of the radio access bearer modification procedure, or if the access network device periodically determines whether the current condition meets the trigger condition of the radio access bearer modification procedure, the access network device may determine, after a next period arrives, whether the current condition meets the trigger condition of the radio access bearer modification procedure.

503: The access network device modifies the radio access bearer.

After determining that the current condition meets the trigger condition of the radio access bearer modification procedure, the access network device modifies the radio access bearer. For detailed descriptions, refer to step 403. Details are not described herein again.

It can be learned from descriptions corresponding to FIG. 4 and FIG. 5 that a condition for modifying the radio access bearer by the access network device is the current condition meets the trigger condition of the radio access bearer modification procedure, and the access network device determines that the terminal device completes the complete registration procedure, or determines that the terminal device does not complete the complete registration procedure, and waits for the terminal device to complete the complete registration procedure. It can be learned that the access network device modifies the radio access bearer only when the foregoing two conditions are met. However, the two conditions may be determined independently, and there is no necessary sequence. Alternatively, there may be a logical sequence. To be specific, the other condition is determined only after one of the conditions is met.

Figure 6A:
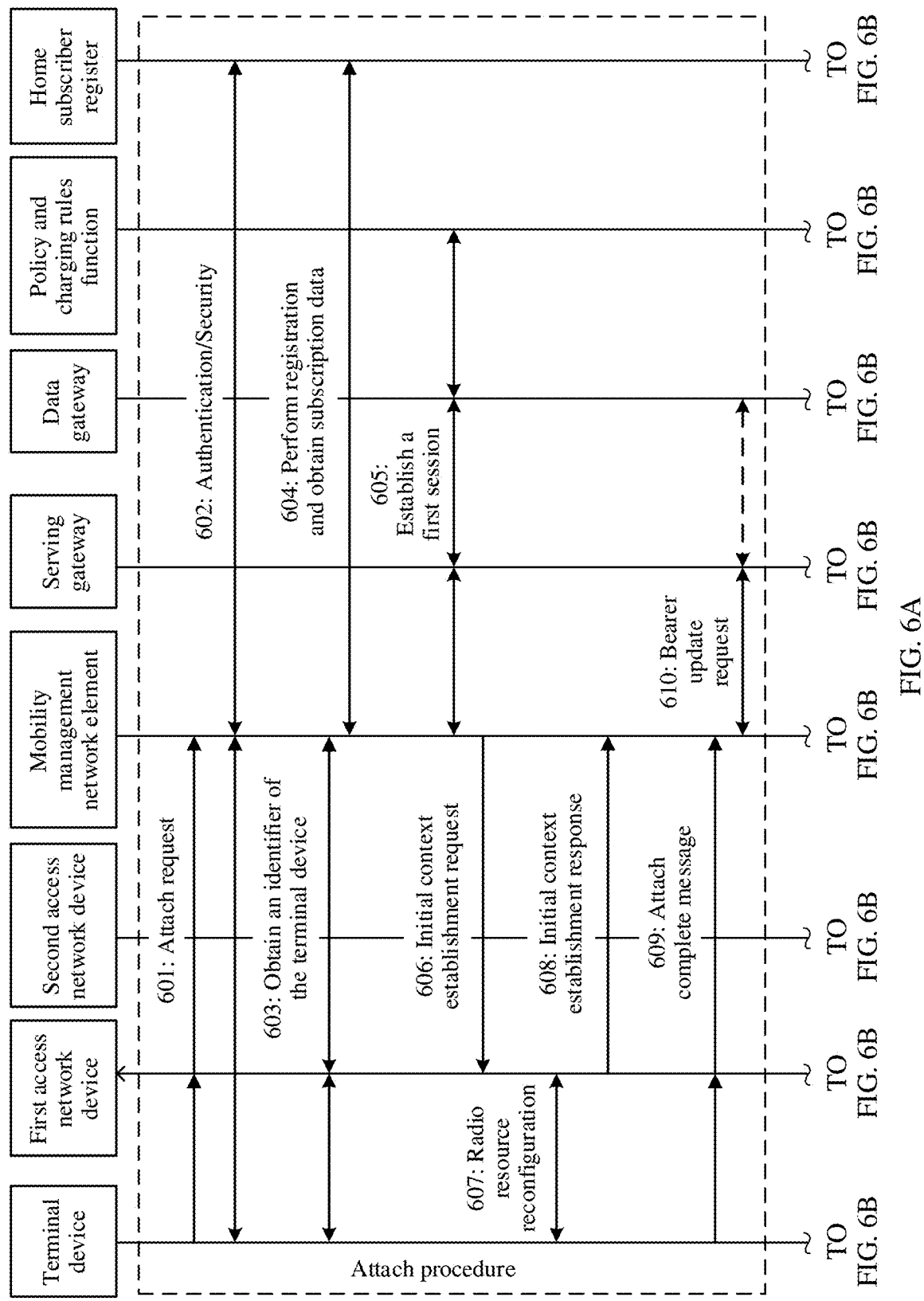

Based on the network architecture shown in FIG. 1, FIG. 6A to FIG. 6C are a schematic flowchart of still another bearer modification method according to an embodiment of the present invention. The bearer modification method shown in FIG. 6A to FIG. 6C is described by using an EPS network as an example, and a mobility management network element is the core network device shown in FIG. 1. As shown in FIG. 6A to FIG. 6C, the bearer modification method may include following steps.

601: A terminal device triggers a complete registration procedure, where the complete registration procedure includes an attach procedure and a PDN connection establishment procedure. In the attach procedure, the terminal device sends an attach request to the mobility management network element by using a first access network device.

602: The mobility management network element triggers an authentication procedure for the terminal device.

603: The mobility management network element obtains an identifier of the terminal device, where the identifier of the terminal device may be an IMSI.

604: The mobility management network element registers information about the mobility management network element with a home subscriber register, and obtains subscription data of the terminal device from the home subscriber register.

605: The terminal device requests to establish a first session, that is, a default bearer of a data service, the mobility management network element indicates a serving gateway and a data gateway to establish the default bearer of the data service, and the data gateway obtains charging and policy rules corresponding to the data service.

606: The mobility management network element sends an initial context establishment request message to the first access network device, to indicate the first access network device to establish context of the terminal device, where the message further carries an E-RAB corresponding to the to-be-established default bearer of the data service. The message further carries an attach acceptance message that needs to be sent to the terminal device.

607: The first access network device performs radio resource reconfiguration with the terminal device, to allocate a radio bearer resource corresponding to the default bearer of the data service.

608: The first access network device replies to the mobility management network element with an initial context establishment response message, where the message carries an IP address and a TEID that are allocated by the first access network device to the E-RAB corresponding to the default bearer of the data service.

609: The terminal device sends an attach complete message to the mobility management network element.

610: The mobility management network element sends a bearer update request to the serving gateway, to send an IP address and a TEID of the access network device to the serving gateway, and optionally, the serving gateway notifies the data gateway of information such as a location of the terminal device.

After the attach procedure is completed, the terminal device triggers the PDN connection establishment procedure included in the complete registration procedure.

611: The terminal device sends a PDN connection establishment request to the mobility management network element, to request to establish a second session, that is, a default bearer of a voice service.

612: The mobility management network element indicates the serving gateway and the data gateway to establish the default bearer of the voice service, and the data gateway obtains charging and policy rules corresponding to the voice service.

613: The mobility management network element sends an E-RAB establishment request to the first access network device.

The E-RAB establishment request requests the first access network device to establish an E-RAB corresponding to the default bearer of the voice service.

614: The first access network device performs radio resource reconfiguration with the terminal device, to allocate a radio bearer resource corresponding to the default bearer of the voice service.

615: The first access network device replies to the mobility management network element with an E-RAB establishment response message.

The E-RAB establishment response message carries an IP address and a TEID that are allocated by the first access network device to the E-RAB corresponding to the default bearer of the voice service. The mobility management network element notifies the serving gateway of the IP address and the TEID that are allocated by the first access network device to the E-RAB corresponding to the default bearer of the voice service. In this case, the default bearer of the voice service is successfully established.

It should be noted that the foregoing complete registration procedure is an example specific to the EPS network. In an actual network, the complete registration procedure includes a plurality of scenarios.

For example, the complete registration procedure may include an attach procedure and a PDN connection establishment procedure. In the attach procedure, the terminal device establishes a first session, that is, a default bearer of a voice service. In the PDN connection establishment procedure, the terminal device establishes a second session, that is, a default bearer of a data service.

For another example, in a 5G network, the complete registration procedure may include a registration procedure, a first-session establishment procedure, and a second-session establishment procedure. The first-session establishment procedure is used to establish a session of a voice service, and the second-session establishment procedure is used to establish a session of a data service.

For another example, in a 5G network, the complete registration procedure may include a registration procedure, a first-session establishment procedure, and a second-session establishment procedure. The first-session establishment procedure is used to establish a session of a data service, and the second-session establishment procedure is used to establish a session of a voice service.

The first access network device may perform step 616 at any time after step 601, and 616 may be the following procedures.

616-a: The first access network device determines that the terminal device completes the complete registration procedure.

The first access network device may determine, based on a quantity of E-RABs in the context of the terminal device established on the first access network device, that the terminal device completes the complete registration procedure. If the quantity of E-RABs is greater than or equal to a threshold, the first access network device determines that the terminal device completes the complete registration procedure.

For example, the threshold of the quantity of E-RABs is 2. When the quantity of E-RABs in the context of the terminal device is greater than or equal to 2, the first access network device determines that the terminal device completes the complete registration procedure.

The first access network device may also determine, based on a parameter of an E-RAB in the context of the terminal device established on the first access network device, that the terminal device completes the complete registration procedure. When the parameter of the E-RAB is a specific value, the first access network device determines that the terminal device completes the complete registration procedure. The context of the terminal device may include one or more E-RABs. When a parameter of one of the E-RABs meets the specific value, it is considered that the terminal device completes the complete registration procedure. The parameter of the E-RAB may include a QoS type, an ARP, an AMBR, or another characteristic parameter. The QoS type is a QCI in the EPS network, or a 5QI in the 5G network. When one or more of the following conditions are met, the first access network device determines that the terminal device completes the complete registration procedure.

The context of the terminal device includes an E-RAB with a QCI of 5 (IMS Signalling), the context of the terminal device includes an E-RAB with an ARP of 1 to 3, the context of the terminal device includes a session/PDN connection with an AMBR of 200 Mbps to 500 Mbps, or another characteristic parameter in the context of the terminal device meets a specific value, for example, a PDU session type is an IPv6 type.

Specifically, the terminal device may have met the one or more of the above conditions and have completed the complete registration procedure. Alternatively, the first access network device starts a timer whose duration is a specific value. Within the specific duration, the terminal device meets the foregoing condition and completes the complete registration procedure.

616-b: The first access network device determines that the terminal device does not complete the complete registration procedure, and waits for the terminal device to complete the complete registration procedure.

Specifically, the first access network device waits until the quantity of E-RABs or the parameter of the E-RAB in the context of the local terminal device meets the condition in step 616-a. Alternatively, waiting time of the first access network device exceeds specific duration. For example, the timer in step 616-a expires.

617: The first access network device determines that a current condition meets a trigger condition of an E-RAB modification procedure.

The E-RAB modification procedure may be a QoS update procedure. The first access network device may send an E-RAB modification indication message to the mobility management network element, where the message may carry a modified QoS parameter, and receive an E-RAB modification indication acknowledgment message returned by the mobility management network element.

The E-RAB modification procedure may alternatively be a procedure such as addition, modification, deletion, or a change of a second access network device in a DC architecture. The first access network device sends an E-RAB modification indication message to the mobility management network element. The message carries an IP address and a TEID of an updated access network device. The IP address and the TEID of the updated access network device may be an IP address and a TEID of the first access network device or the second access network device.

Further, the E-RAB modification indication message and the E-RAB indication acknowledgment message are merely examples, and specific message names are not limited in this embodiment. For example, when used in the 5G network, the message names may be a packet data unit (PDU) session resource update indication message and a PDU session resource update acknowledgment message.

The trigger condition may be one or a combination of more of the first access network device is overloaded, a load of the first access network device decreases, the first access network device cannot satisfy QoS of the E-RAB, a signal of the second access network device meets a requirement, the terminal device has established a session of a specific service, the terminal device is outside current coverage of the second access network device, or the like.

For example, when the first access network device cannot meet a QoS requirement of the E-RAB, a QoS update procedure may be triggered to modify a QoS parameter of the E-RAB. After the first access network device establishes the session of the data service, if signal strength of the second access network device meets a requirement, a an addition procedure or a modification procedure of the second access network device may be triggered to establish a forwarding channel of a service data packet on the second access network device, if the signal strength of the second access network device does not meet the requirement, the first access network device may trigger a deletion procedure of the second access network device, to establish a forwarding channel of a service data packet of the terminal device on the first access network device, or if the signal strength of the second access network device does not meet the requirement, but signal strength of another second access network device meets the requirement, a change procedure of the second access network device may be triggered to establish a forwarding channel of a service data packet of the terminal device on the another second access network device.

It should be noted that the first access network device may determine, before or after step 616, that the current condition meets the trigger condition of the E-RAB modification procedure. This is not limited in this embodiment.

It should be noted that the procedure such as addition, modification, deletion, or the change of the second access network device further involves interaction between the terminal device and the second access network device. For the E-RAB modification indication message and interaction between mobility management network elements, an addition procedure of the second access network device is specifically used as an example.

618: The access network device sends, to the second access network device, a request message for adding the second access network device, for example, to establish the E-RAB corresponding to the default bearer of the data service on the second access network device.

619: The second access network device replies with a request acknowledgment message for adding the second access network device, where the message carries an IP address and a TEID that are allocated by the second access network device to the E-RAB corresponding to the default bearer of the data service.

620: The first access network device performs radio resource reconfiguration with the terminal device, to allocate a radio bearer resource of a second base station to the default bearer of the data service.

621: The first access network device notifies the second access network device that the radio resource reconfiguration is completed.

After interaction between the first access network device and the second access network device, the first access network device initiates an E-RAB handover procedure to the mobility management network element. Specific steps may be as follows.

622: The first access network device sends an E-RAB update indication message to the mobility management network element, where the message carries the IP address and the TEID that are allocated by the second access network device to the E-RAB corresponding to the default bearer of the data service.

623: The mobility management network element indicates the serving gateway to update a bearer.

The updated bearer may send, to the serving gateway, the IP address and the TEID that are allocated by the second access network device to the E-RAB corresponding to the default bearer of the data service.

624: The mobility management network element sends an E-RAB update indication acknowledgment message to the first access network device.

It should be noted that, if the trigger condition of the E-RAB modification procedure is irrelevant to the second access network device, the first access network device may not need to interact with the second access network device, but may directly perform the E-RAB modification procedure shown in steps 622 to 624.

In the foregoing procedures, step 622 conflicts with the complete registration procedure of the terminal device. In this case, in an actual scenario, the first access network device may first perform steps 618 to 621, and may perform the determining in step 616 before performing step 622. The first access network device may also perform the determining in step 616 before step 618, and trigger an entire procedure after a condition is met. Step 616 may be performed at any time between steps 608 and 617. FIG. 6A and FIG. 6B illustrate an embodiment in which step 616 is performed between steps 610 and 611.

Step 616 may be performed before step 617, may be performed after step 617, or may be performed simultaneously with step 617. Time for performing step 616 and time for performing step 617 may not be limited. Steps 616 and 617 are two conditions that need to be met before the radio access bearer is modified in the embodiments corresponding to FIG. 4 and FIG. 5. Steps 622 to 624 may be steps of modifying the radio access bearer in the embodiments corresponding to FIG. 4 and FIG. 5, provided that steps 616 and 617 are performed before step 622.

The QoS update procedure may be as follows: The first access network device sends, to the mobility management network element, an E-RAB update indication message that carries a QoS parameter, the mobility management network element indicates the serving gateway to update a bearer, where the updated bearer may send updated QoS to the serving gateway, the mobility management network element sends an E-RAB update indication acknowledgment message to the first access network device.

For specific descriptions of the foregoing steps, refer to the descriptions shown in FIG. 2A and FIG. 2B. Details are not described herein again.

Figure 7A:
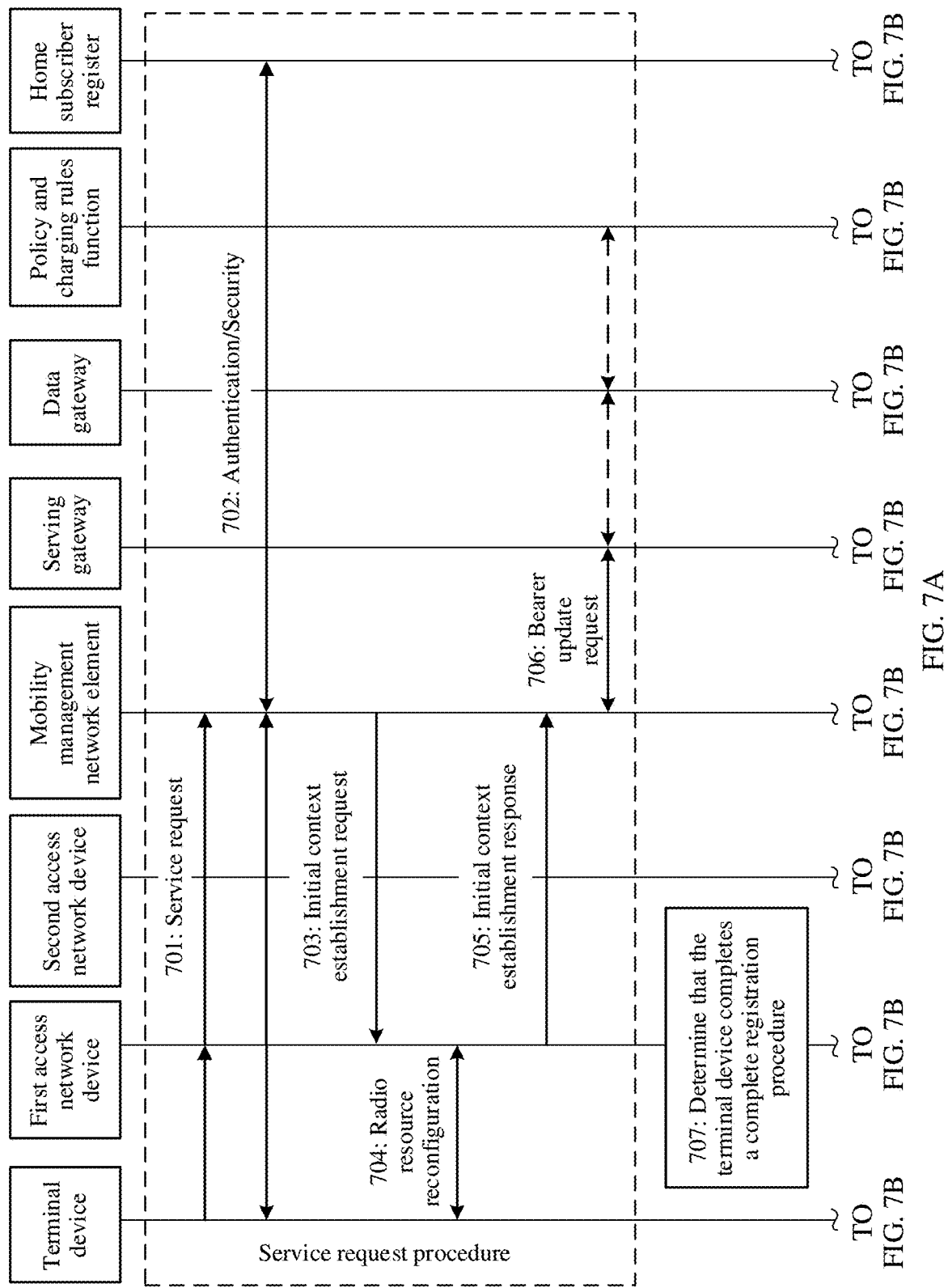

Based on the network architecture shown in FIG. 1, FIG. 7A and FIG. 7B are a schematic flowchart of still another bearer modification method according to an embodiment of the present invention. The bearer modification method shown in FIG. 7A and FIG. 7B is described by using an EPS network as an example, and a mobility management network element is the core network device shown in FIG. 1. The complete registration procedure in FIG. 6A to FIG. 6C includes an attach procedure and a PDN connection establishment procedure, while the complete registration procedure in FIG. 7A includes only a service request procedure. As shown in FIG. 7A and FIG. 7B, the bearer modification method may include following steps.

701: A terminal device sends a service request message to the mobility management network element by using a first access network device.

702: The mobility management network element triggers an authentication procedure for the terminal device.

703: The mobility management network element sends an initial context establishment request message to the first access network device.

The initial context request message further carries an E-RAB corresponding to a to-be-established bearer of the terminal device, and may include one or more E-RABs. For example, the initial context request message includes two E-RABs: an E-RAB of a data service and an E-RAB of a voice service.

704: The first access network device performs radio resource reconfiguration with the terminal device, to allocate a radio bearer resource corresponding to the bearer.

705: The first access network device replies to the mobility management network element with an initial context establishment response message, where the message further carries an IP address and a TEID that are allocated by the first access network device to each of the E-RAB of the data service and the E-RAB of the voice service.

706: The mobility management network element indicates a serving gateway to update the bearer.

The mobility management network element sends a bearer update request to the serving gateway, to send, to the serving network element, an IP address and a TEID of the access network device corresponding to the bearer. The serving gateway optionally notifies a data gateway of information such as a location of user equipment.

The first access network device may trigger modification to an E-RAB of the terminal device.

707: The first access network device determines that the terminal device completes the complete registration procedure.

The first access network device may determine, based on a quantity of E-RABs in context of the terminal device established on the first access network device, that the terminal device completes the complete registration procedure. If the quantity of E-RABs is greater than or equal to a threshold, the first access network device determines that the terminal device completes the complete registration procedure.

For example, the threshold of the quantity of E-RABs is 2. When the quantity of E-RABs in the context of the terminal device is greater than or equal to 2, the first access network device determines that the terminal device completes the complete registration procedure.

The first access network device may also determine, based on a parameter of the E-RAB in the context of the terminal device established on the first access network device, that the terminal device completes the complete registration procedure. When the parameter of the E-RAB is a specific value, the first access network device determines that the terminal device completes the complete registration procedure. The parameter of the E-RAB may include a QoS type, an ARP, an AMBR, or another characteristic parameter. The QoS type is a QCI in the EPS network, or a 5QI in a 5G network. When one or more of the following conditions are met, the first access network device determines that the terminal device completes the complete registration procedure.

The context of the terminal device includes an E-RAB with a QCI of 5 (IMS Signalling), the context of the terminal device includes an E-RAB with an ARP of 1 to 3, the context of the terminal device includes a session/PDN connection with an AMBR of 200 Mbps to 500 Mbps, or another characteristic parameter in the context of the terminal device meets a specific value, for example, a PDU session type is an IPv6 type.

In this embodiment, the terminal device has met the foregoing conditions and has completed the complete registration procedure.

Steps 708 to 715 are the same as steps 617 to 624. For detailed description, refer to the descriptions corresponding to FIG. 6C. Details are not described herein again.

In the foregoing procedures, the complete registration procedure may be the service request procedure, a tracking area update procedure, and the like. In the service request procedure or the tracking area update procedure, both a default bearer of a data service of the terminal device and a default bearer of a voice service of the terminal device have been established in the service request procedure or the tracking area update procedure. Therefore, there is no PDN connection establishment procedure, and there is no conflict scenario. Before, after, or when determining that a current condition meets a trigger condition of an E-RAB modification procedure, the first access network device may determine that the terminal device meets a condition for completing the complete registration procedure, and then may directly modify the E-RAB. Step 707 may correspond to step 402 in the embodiment corresponding to FIG. 4 or step 501 in the embodiment corresponding to FIG. 5. Step 708 may correspond to step 401 in the embodiment corresponding to FIG. 4 or step 502 in the embodiment corresponding to FIG. 5. Steps 713 to 715 may correspond to step 403 in the embodiment corresponding to FIG. 4 or step 503 in the embodiment corresponding to FIG. 5. There is no conflict procedure in the foregoing procedures. Therefore, it may be immediately determined that the terminal device meets the condition for completing the complete registration procedure, provided that the terminal device completes the complete registration procedure.

Figure 8:
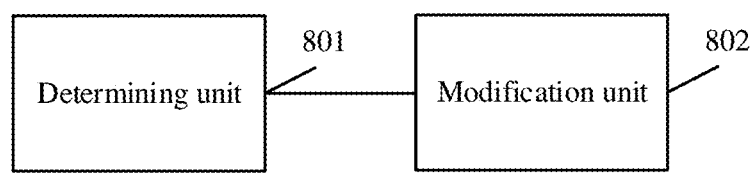
FIG. 8 is a schematic diagram of a structure of an access network device according to an embodiment of the present invention.

Based on the network architecture shown in FIG. 1 and a same concept of the bearer modification method in the foregoing embodiments, FIG. 8 is a schematic diagram of a structure of an access network device according to an embodiment of the present invention. The access network device may be applied to the bearer modification methods shown in FIG. 3 to FIG. 7B. As shown in FIG. 8, the access network device may include a determining unit 801, configured to determine that a terminal device completes a complete registration procedure, or determine that the terminal device does not complete the complete registration procedure, and wait for the terminal device to complete the complete registration procedure, and a modification unit 802, configured to modify a radio access bearer.

In an embodiment, that the determining unit 801 determines that a terminal device completes a complete registration procedure includes determining that the terminal device has completed the complete registration procedure, or determining that the terminal device completes the complete registration procedure within first time.

In an embodiment, that the terminal device completes a complete registration procedure includes a quantity of radio access bearers in context of the terminal device is greater than or equal to a first threshold, and/or a parameter of one radio access bearer included in the context of the terminal device is a specific value.

In an embodiment, that the determining unit waits for the terminal device to complete the complete registration procedure may include one or more of the following, including quantity of radio access bearers in context of the terminal device is greater than or equal to a first threshold, a parameter of one radio access bearer included in the context of the terminal device is a specific value, or waiting time of the access network device exceeds first time.

In an embodiment, the parameter of the radio access bearer may be one or more of a QoS type, an ARP, and an AMBR.

In an embodiment, the QoS type may be a QCI or a 5QI.

In an embodiment, the determining unit 801 is further configured to before the modification unit 802 modifies the radio access bearer, determine that a current condition meets a trigger condition of a radio access bearer modification procedure. The radio access bearer modification procedure may include addition, modification, deletion, or a change of a second access network device.

In an embodiment, the modification unit specifically configured to send a radio access bearer update indication message to a mobility management network element, where the radio access bearer update indication message carries an IP address and a TEID of a second access network device, and receive a radio access bearer update indication acknowledgment message from the mobility management network element.

For more detailed descriptions of the determining unit 801 and the modification unit 802, refer to related descriptions of the access network device in the method embodiments shown in FIG. 3 to FIG. 7B. Details are not described herein again.

Figure 9:
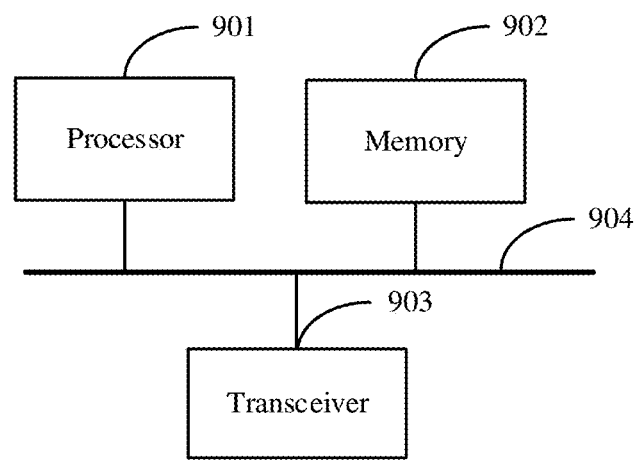
FIG. 9 is a schematic diagram of a structure of another access network device according to an embodiment of the present invention.

Based on the network architecture shown in FIG. 1, FIG. 9 is a schematic diagram of a structure of another access network device according to an embodiment of the present invention. The access network device may be applied to the bearer modification methods shown in FIG. 3 to FIG. 7B. As shown in FIG. 9, the access network device may include a processor 901, a memory 902, a transceiver 903, and a connection line 904. The memory 902 may exist independently, and the connection line 904 and the processor 901 are connected. Alternatively, the memory 902 may be integrated with the processor 901. The transceiver 903 is configured to communicate with another device, network element, or communications network, such as the Ethernet, a radio access network (RAN), or a wireless local area network (WLAN). The connection line 904 may include a channel for transferring information between the foregoing components. The memory 902 stores program instructions, and the processor 901 is configured to execute the program instructions stored in the memory 902.

When the program instructions stored in the memory 902 are executed, the processor 901 is configured to invoke the program instructions stored in the memory 902, to perform the operations performed by the determining unit 801 in the foregoing embodiment and operations other than sending and receiving performed the modification unit 802. The transceiver 903 is configured to perform the sending and receiving operations performed by the modification unit 802 in the foregoing embodiment.

An embodiment of the present invention discloses a storage medium. The storage medium stores a program. When the program is run, the bearer modification method shown in FIG. 3 to FIG. 7B is implemented.

It may be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

All or some of the methods in the embodiments of this application may be implemented by software, hardware, firmware, or any combination thereof. When the software is used to implement the embodiments, all or some of the embodiments may be implemented in a form of a computer program product. The computer program product includes one or more computer programs or instructions. When the computer programs or instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted via the computer-readable storage medium. The computer-readable storage medium may be any usable medium accessible by a computer, or a data storage device, such as a server integrating one or more usable media. The usable medium may be a magnetic medium such as a floppy disk, a hard disk, or a magnetic tape, may be an optical medium such as a compact disc read-only memory (CD-ROM) or a digital versatile disc (DVD), or may be a semiconductor medium such as a solid-state disk (SSD), a random access memory (RAM), a read-only memory (ROM), or a register.

For example, the storage medium is coupled to a processor, so that the processor can read information from the storage medium and write information into the storage medium. Certainly, the storage medium may be a component of the processor. The processor and the storage medium may be located in an ASIC. In addition, the ASIC may be located in a network device or a terminal device. Certainly, the processor and the storage medium may exist in a sending device or a receiving device as discrete components.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that the numbers in the embodiments of this application are merely used for differentiation for ease of description, but are not used to limit the scope of the embodiments of this application. Sequence numbers of the foregoing processes do not mean execution sequences. The execution sequences of the processes should be determined based on functions and internal logic of the processes.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement or improvement made based on technical solutions of this application shall fall within the protection scope of this application.

What is claimed is:

1. A bearer modification method, comprising:
performing at least one of:
determining, by an access network device, that a terminal device completes a complete registration procedure; or
determining, by an access network device, that the terminal device has not completed the complete registration procedure, and waiting for the terminal device to complete the complete registration procedure in response to determining that the terminal device has not completed the complete registration procedure; and
modifying, by the access network device, a radio access bearer of the terminal device after the access network device determines that the registration procedure of the terminal device is completed, wherein the modifying the radio access bearer comprises:
sending, by the access network device, a radio access bearer update indication message to a core network device, wherein the radio access bearer update indication message carries an Internet protocol (IP) address and a tunnel endpoint identifier (TEID) of an updated access network device, and wherein the updated access network device is the access network device or a second access network device; and
receiving, by the access network device, a radio access bearer update indication acknowledgment message from the core network device.

2. The method according to claim 1, wherein the determining that the terminal device completes the complete registration procedure comprises performing at least one of:
determining, by the access network device, that the terminal device has completed the complete registration procedure; or
determining, by the access network device, that the terminal device completes the complete registration procedure within a first time.

3. The method according to claim 2, wherein the terminal device completing the complete registration procedure comprises one or more of:
a quantity of radio access bearers in context of the terminal device being greater than, or equal to, a first threshold; or
a parameter of one radio access bearer of the context of the terminal device being a specific value.

4. The method according to claim 3, wherein the parameter of the radio access bearer is one or more of a quality of service (QoS) type, an allocation and retention priority (ARP), or an aggregate maximum bit rate (AMBR).

5. The method according to claim 4, wherein the QoS type is a quality of service class identifier (QCI) or a 5G quality of service identifier (5QI).

6. The method according to claim 1, wherein the waiting for the terminal device to complete the complete registration procedure comprises determining whether the complete registration procedure results in one or more:
a quantity of radio access bearers in context of the terminal device being greater than or equal to a first threshold;
a parameter of one radio access bearer comprised in the context of the terminal device being a specific value; or
a waiting time of the access network device exceeding a first time.

7. The method according to claim 1, further comprising performing, before the modifying the radio access bearer:
determining, by the access network device, that a current condition meets a trigger condition of a radio access bearer modification procedure, wherein the radio access bearer modification procedure comprises at least one of addition, modification, deletion, or a change of the second access network device.

8. An access network device, comprising:
a processor;
a non-transitory memory coupled to the processor or included in the processor, the memory storing a program for execution by the processor, the program including instructions to:
perform at least one of:
determine that a terminal device completes a complete registration procedure; or
determine that the terminal device has not completed the complete registration procedure, and wait for the terminal device to complete the complete registration procedure in response to determining that the terminal device has not completed the complete registration procedure; and
modify a radio access bearer of the terminal device after the access network device determines that the registration procedure is completed, wherein the instructions to modify the radio access bearer of the terminal device include instructions to:
send a radio access bearer update indication message to a core network device, wherein the radio access bearer update indication message carries an internet protocol (IP) address and a tunnel endpoint identifier (TEID) of an updated access network device, and wherein the updated access network device is the access network device or a second access network device; and
receive a radio access bearer update indication acknowledgment message from the core network device.

9. The access network device according to claim 8, wherein the instructions to determine that the terminal device completes the complete registration procedure comprises instructions to perform at least one of:
determine that the terminal device has completed the complete registration procedure; or
determine that the terminal device completes the complete registration procedure within a first time.

10. The access network device according to claim 9, wherein the terminal device completing the complete registration procedure comprises one or more of:
a quantity of radio access bearers in context of the terminal device being greater than or equal to a first threshold; or
a parameter of one radio access bearer of the context of the terminal device being a specific value.

11. The access network device according to claim 10, wherein the parameter of the radio access bearer is one or more of a quality of service (QoS) type, an allocation and retention priority (ARP), or an aggregate maximum bit rate (AMBR).

12. The access network device according to claim 11, wherein the QoS type is a quality of service class identifier (QCI) or a 5G quality of service identifier (5QI).

13. The access network device according to claim 8, wherein the instructions to wait for the terminal device to complete the complete registration procedure comprises instructions to determine whether the complete registration procedure results in one or more of:
a quantity of radio access bearers in context of the terminal device being greater than or equal to a first threshold;
a parameter of one radio access bearer comprised in the context of the terminal device being a specific value; or
a waiting time of the access network device exceeding a first time.

14. The access network device according to claim 8, wherein the program further includes instructions to perform, before modifying the radio access bearer:
determine that a current condition meets a trigger condition of a radio access bearer modification procedure, wherein the radio access bearer modification procedure comprises at least one of addition, modification, deletion, or a change of the second access network device.

15. A non-transitory computer-readable storage medium, wherein the storage medium stores instructions, that when executed by a processor, cause the processor to:
perform at least one of:
determine that a terminal device completes a complete registration procedure; or
determine that the terminal device has not completed the complete registration procedure, and wait for the terminal device to complete the complete registration procedure in response to determining that the terminal device has not completed the complete registration procedure; and
modify a radio access bearer of the terminal device after determining that the registration procedure of the terminal device is complete, wherein the instructions to modify the radio access bearer of the terminal device include instructions to:
send a radio access bearer update indication message to a core network device, wherein the radio access bearer update indication message carries an internet protocol (IP) address and a tunnel endpoint identifier (TEID) of an updated access network device, and wherein the updated access network device is an access network device or a second access network device; and
receive a radio access bearer update indication acknowledgment message from the core network device.

16. The non-transitory computer-readable storage medium according to claim 15, wherein the instructions that cause the processor to wait for the terminal device to complete the complete registration procedure include instructions to cause the processor to determine whether the complete registration procedure results in one or more of:
a quantity of radio access bearers in context of the terminal device being greater than or equal to a first threshold;
a parameter of one radio access bearer comprised in the context of the terminal device being a specific value; or
a waiting time of the access network device exceeding a first time.

17. The non-transitory computer-readable storage medium according to claim 15, wherein the instructions further cause the processor to perform, before modifying the radio access bearer:
determine that a current condition meets a trigger condition of a radio access bearer modification procedure, wherein the radio access bearer modification procedure comprises at least one of addition, modification, deletion, or a change of the second access network device.

* * * * *

UNITED STATES PATENT AND TRADEMARK OFFICE
CERTIFICATE OF CORRECTION

PATENT NO. : 12,256,278 B2
APPLICATION NO. : 17/525206
DATED : March 18, 2025
INVENTOR(S) : Yin et al.

Page 1 of 1

It is certified that error appears in the above-identified patent and that said Letters Patent is hereby corrected as shown below:

In the Claims

In Column 23, in Claim 5, Line 56, delete "(5Q1)." and insert -- (5QI). --.

In Column 24, in Claim 12, Line 64, delete "(5Q1)." and insert -- (5QI). --.

Signed and Sealed this
Fifteenth Day of April, 2025

Coke Morgan Stewart
*Acting Director of the United States Patent and Trademark Office*